(12) United States Patent
Shimizu

(10) Patent No.: US 8,264,217 B2
(45) Date of Patent: Sep. 11, 2012

(54) MOVING VEHICLE SYSTEM AND METHOD OF DETECTING POSITION OF MOVING VEHICLE

(75) Inventor: Tetsuya Shimizu, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 372 days.

(21) Appl. No.: 12/763,315

(22) Filed: Apr. 20, 2010

(65) Prior Publication Data

US 2010/0271011 A1 Oct. 28, 2010

(30) Foreign Application Priority Data

Apr. 24, 2009 (JP) ................. 2009-106586

(51) Int. Cl.
*G01B 7/14* (2006.01)
(52) U.S. Cl. ................. 324/207.13
(58) Field of Classification Search .......... None
See application file for complete search history.

(56) References Cited

U.S. PATENT DOCUMENTS

| 5,781,119 | A |   | 7/1998 | Yamashita et al. |   |
|---|---|---|---|---|---|
| 6,032,110 | A | * | 2/2000 | Ishihara et al. | 702/150 |
| 8,135,614 | B2 | * | 3/2012 | Allen et al. | 705/13 |
| 8,188,892 | B2 | * | 5/2012 | Shimizu | 340/988 |

| 2002/0017902 | A1 | 2/2002 | Vasiloiu |
|---|---|---|---|
| 2009/0278710 | A1 | 11/2009 | Shimizu |
| 2010/0109670 | A1 | 5/2010 | Arnaud et al. |

FOREIGN PATENT DOCUMENTS

| JP | 05-250506 A | 9/1993 |
|---|---|---|
| JP | 5-274030 A | 10/1993 |
| JP | 08-314540 A | 11/1996 |
| JP | 09-237399 A | 9/1997 |
| JP | 10-255200 A | 9/1998 |
| JP | 2002-039793 A | 2/2002 |
| JP | 2002-337037 A | 11/2002 |
| JP | 2003-097904 A | 4/2003 |
| JP | 2005-31014 A | 2/2005 |
| JP | 2007-010535 A | 1/2007 |
| JP | 2009-2660 A | 1/2009 |
| JP | 2009-276827 A | 11/2009 |
| JP | 2009-539090 A | 11/2009 |

OTHER PUBLICATIONS

Official Communication issued in corresponding Japanese Patent Application No. 2009-106586, mailed on May 17, 2011.

* cited by examiner

*Primary Examiner* — Paresh Patel
(74) *Attorney, Agent, or Firm* — Keating & Bennett, LLP

(57) ABSTRACT

A detection head is provided for a moving vehicle. The detection head includes a coil array defined by a plurality of coils arranged along a moving direction of the moving vehicle. Dummy coils are provided on both sides of the coil array. Based on a difference between outputs of the dummy coils, whether the moving vehicle is in a continuous segment where the magnetic marks are provided at a constant first pitch or a discrete segment where the magnetic marks are arranged at a pitch wider than the first pitch is identified.

5 Claims, 6 Drawing Sheets

30: Continuous segment    31: Discrete segment

MOVING VEHICLE SYSTEM AND METHOD OF DETECTING POSITION OF MOVING VEHICLE

BACKGROUND OF THE INVENTION

1. Field of the Invention

The present invention relates to a moving vehicle system. In particular, the present invention relates to position detection of a moving vehicle.

2. Description of the Related Art

In a known system, a detection head having a coil array including a plurality of coils is provided along a moving direction of a moving vehicle such as a transportation vehicle, a stacker crane, or a head of a working machine, and magnetic marks provided on the ground are detected to determine the position of the moving vehicle (See, for example, JP2002-337037A). With respect to such a system, the inventor studied to provide continuous segments where magnetic marks are arranged at a first pitch equal to the length of, e.g., a coil array to determine the position of the moving vehicle continuously, and discrete segments where magnetic marks are arranged at a pitch wider than the first pitch to determine the position of the moving vehicle only in segments including the magnetic marks. Further, magnetic sensors such as hall elements are provided at both ends of the detection head to detect the magnetic marks, and identify whether the moving vehicle is in the discrete segment or the continuous segment.

According to experiments of the inventor, in the case where the magnetic marks are present in the vicinity of a central portion of the coil array, the same position detection results are obtained regardless of the discrete segment or the continuous segment. It is because the coil array is influenced by only one magnetic mark. Further, a state in which the magnetic marks are provided at both ends of the coil array in the continuous segment and a state in which the magnetic mark is provided only at one end of the coil array in the discrete segment can be identified easily by the hall element. In this case, since no detection is performed in the discrete segments and detection is only performed in the continuous segments, no problems occur. In the case where a magnetic mark is present slightly inside one end of the coil array, another magnetic mark is present slightly outside the other end of the coil array in the continuous segment, and such a magnetic mark is not preset in the discrete segment. In this state, different detection results are obtained depending on the discrete segment or the continuous segment. However, the magnetic mark positioned slightly outside the coil array cannot be detected by the hall element, and whether the moving vehicle is in the discrete segment or the continuous segment cannot be identified. Therefore, for identification, another hall element needs to be provided outside in a direction in which the coil array is extended. However, provision of another hall element is not preferable since the length of the detection head is increased, and the number of components of the detection head is increased.

SUMMARY OF THE INVENTION

A preferred embodiment of the present invention identifies whether a moving vehicle is in a discrete segment or a continuous segment with a simple structure, and improves the precision of detecting the position of the moving vehicle.

According to a preferred embodiment of the present invention, a moving vehicle system detects a position of a moving vehicle by providing the moving vehicle with a detection head including a coil array defined by a plurality of coils arranged along a moving direction of the moving vehicle, and detecting magnetic marks provided along a moving route of the moving vehicle.

The moving route includes continuous segments where the magnetic marks are provided at a constant first pitch to determine the position of the moving vehicle continuously, and discrete segments where the magnetic marks are arranged at a pitch wider than the first pitch to determine the position of the moving vehicle only in segments including the magnetic mark.

The detection head preferably includes dummy coils on both sides of the coil array.

The moving vehicle includes an identification unit arranged to identify whether the moving vehicle is in one of the continuous segments or one of the discrete segments.

Further, according to a preferred embodiment of the present invention, a method of detecting a position of a moving vehicle by providing the moving vehicle with a detection head including a coil array defined by a plurality of coils arranged along a moving direction of the moving vehicle, and detecting the magnetic marks provided along a moving route of the moving vehicle is provided. The method includes the steps of providing the moving route with continuous segments where the magnetic marks are provided at a constant first pitch to determine the position of the moving vehicle continuously, and discrete segments where the magnetic marks are arranged at a pitch wider than the first pitch to determine the position of the moving vehicle only in segments including the magnetic mark; providing dummy coils on both sides of the coil array; and identifying whether the moving vehicle is in one of the continuous segments or one of the discrete segments based on a difference between outputs of the dummy coils.

In this specification, description regarding the moving vehicle system is directly applicable to the method of detecting the position of the moving vehicle, and description regarding the method of detecting the position of the moving vehicle is directly applicable to the moving vehicle system.

The dummy coil is a coil arranged to detect a magnetic field from a magnetic mark. The dummy coil also functions to match conditions of detecting surrounding magnetic fields, for the coil at the end in the coil array and other coils inside the coil array. In the following statement, it is assumed that the coil array does not include any dummy coil. Assuming that a magnetic mark is present inside one end of the coil array, the state where the dummy coil is placed at the other end varies depending on the case where another magnetic mark is present outside the other end in the continuous segment, and the case where no magnetic mark is present at the other end in the discrete segment. When the difference in the state is detected as a difference between outputs of the dummy coils, whether the moving vehicle is in the discrete segment or the continuous segment can be identified. Further, it is sufficient to place the dummy coils adjacent to the coil array. No gap is required between the dummy coils and the coil array. Therefore, in various preferred embodiments of the present invention, whether the moving vehicle is in the continuous segment or the discrete segment can be identified easily without increasing the length of the detection head, and precision of position detection is improved. For example, an identification unit is preferably provided in the detection head. Alternatively, in the case where a signal from the coil array is processed by a main body of the moving vehicle outside the detection head, the identification unit may be provided in the main body of the moving vehicle.

Preferably, the coil array and the dummy coils are connected to a common alternating current power supply, and coils of the coil array and the dummy coils are provided along a common magnetic core. In the structure, the dummy coils can be provided and excited easily. Further, the balance between impedances of the dummy coils on both sides can be kept easily.

More preferably, the dummy coils and the coils of the coil array have the same shape. In the structure, it is sufficient to provide dummy coils having the same shape as the other coils of the coil array, on both sides of the same magnetic core. Therefore, the dummy coils can be provided more easily. Further, the balance between impedances of the dummy coils on both sides can be kept more reliably.

Particularly preferably, the dummy coils on both sides are serially connected to an alternating current power supply, and whether the moving vehicle is in one of the continuous segments or in one of the discrete segments can be identified by comparing a phase of a potential at a middle point of the dummy coils on both sides with a phase of the alternating current power supply. In this structure, with the simple circuit, whether the moving vehicle is in the continuous segment or the discrete segment can be identified reliably.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
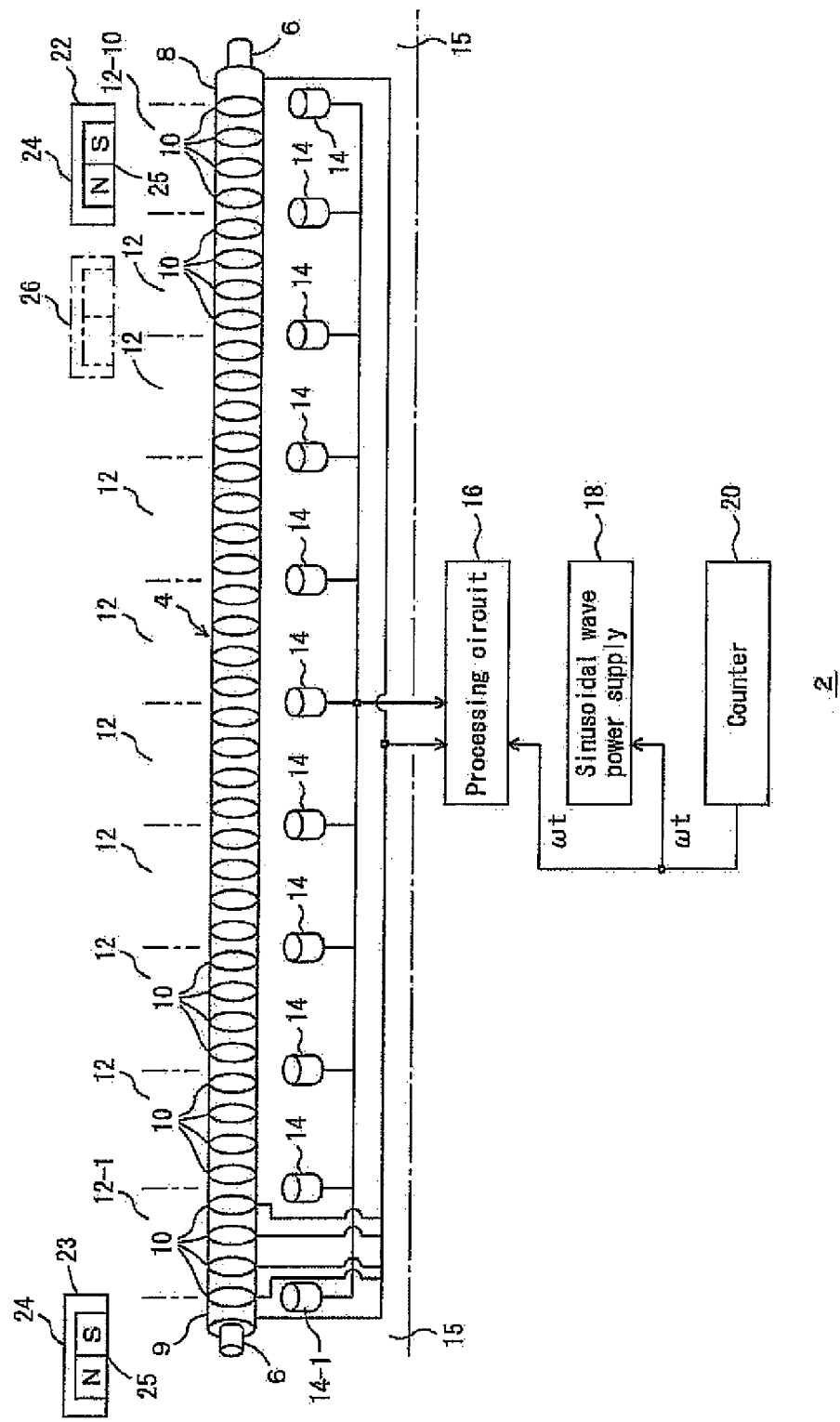
FIG. 1 is a view showing a linear scale and magnetic marks on the ground in a moving vehicle system according to a preferred embodiment of the present invention.

Hereinafter, preferred embodiments in the most preferred form will be described. The preferred embodiments can be modified suitably with reference to techniques known in this technical field. Therefore, the preferred embodiments should not be construed as limiting the scope of the present invention.

FIGS. 1 to 8 show a moving vehicle system according to a preferred embodiment of the present invention. In the drawings, a reference numeral 2 denotes a linear scale having a coil array 4 provided along a moving direction of a moving vehicle (not shown). Reference numerals 6 denote a magnetic core of the coil array 4. At both of left and right ends of the coil array 4, for example, a pair of dummy coils 8, 9 are provided. Alternatively, two or more dummy coils may be provided at each of left and right ends of the coil array 4. Reference numerals 10 denote coils of the coil array 4. For example, one pitch 12 corresponds to the size of four coils 10. For example, ten pitches 12 are provided in a longitudinal direction of the coil array 4, i.e., the moving direction of the moving vehicle, and coils corresponding to the ten pitches are arranged to define the coil array 4.

Reference numerals 14 denote hall elements. For example, the hall elements 14 are provided at both ends of the coil array 4, and between each of adjacent pitches 12 for detecting magnetic marks 22 or the like. The coil array 4, the dummy coils 8, 9, and the hall elements 14 define a detection head 15 of the linear scale 2. A signal outputted from the detection head 15 is processed by a processing circuit 16 to determine the current position of the moving vehicle. Further, a sinusoidal wave power supply 18 is used to apply sinusoidal wave electrical current to each of the coils 10 of the coil array 4 and the dummy coils 8, 9 to generate a phase signal ωt having a sinusoidal wave, and the phase signal ωt is supplied to the processing circuit 16 and the sinusoidal wave power supply 18.

The magnetic marks 22 or the like are provided along a moving route of the moving vehicle. Each of the magnetic marks or the like includes a yoke 24 and a permanent magnet 25. The dummy coils 8, 9, the hall elements 14, and the coils 10 detect magnetic fields from the magnetic marks 22 or the like. In continuous segments, the magnetic marks 22 or the like are arranged at a pitch equal to the total length of the coil array 4. In discrete segments, the magnetic marks 22 or the like are arranged at a pitch wider than the pitch of the magnetic marks in the continuous segments. For example, the discrete segment is a curved segment, or a segment before or after the curved segment. In the discrete segment, it is not necessary to arrange the magnetic marks 22 at the same pitch. In the continuous segment, the pitch of arranging the magnetic marks 22, 23 are determined to be equal to the total length of the coil array 4.

Reference numerals 22, 23 in FIG. 1 denote the magnetic marks in the continuous segment. In FIG. 1, the magnetic marks 22, 23 are shown at both ends of the coil array 4. It is assumed that a magnetic mark 26 in FIG. 1 has been detected. Structure of the magnetic mark 26 is the same as that of the magnetic marks 22, 23. In the case where one magnetic mark 26 has been detected, it is not possible to identify whether the magnetic mark 26 belongs to one of the continuous segments or one of the discrete segments. In this case, in the continuous segment, another magnetic mark is present on the left side of the dummy coil 9, and in the discrete segment, no magnetic mark is present on the left side of the dummy coil 9. It is difficult to detect the magnetic mark on the left side of the dummy coil 9 using a hall element 14-1 at the left end of the coil array 4. Therefore, if hall elements at both ends of the linear scale 2 are used for identification, even if the moving vehicle is in the continuous segment, the hall elements may mistakenly identify that the moving vehicle is in the discrete segment. In this regard, in the present preferred embodiment of the present invention, since the magnetic core 6 passing through the dummy coils 8, 9 can detect magnets spaced outwardly from the dummy coils 8, 9, using the magnetic core 6, whether another magnetic mark is present is detected on each of both sides outside the coil array 4.

Figure 2:
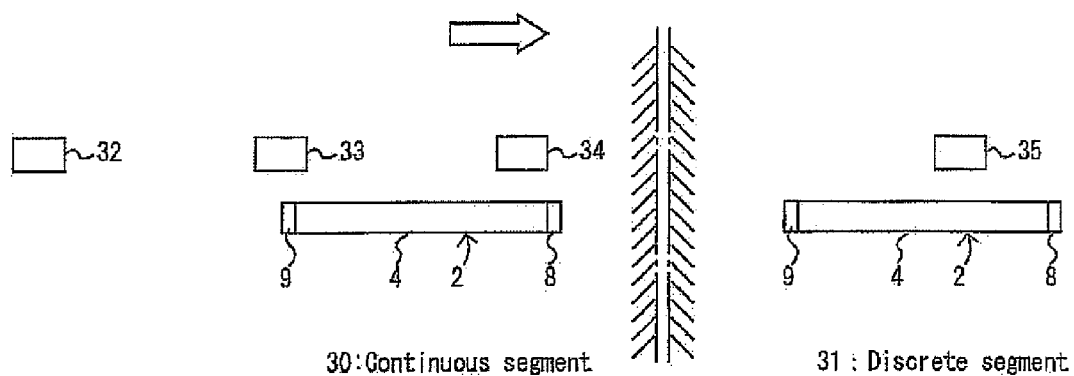
FIG. 2 is a view schematically showing positions of magnetic marks in a discrete segment and a continuous segment.

FIG. 2 shows positions of magnetic marks 32 to 34 in a continuous segment 30, and a position of a magnetic mark 35 in a discrete segment 31. The magnetic marks 32 to 35 preferably have the same structure as that of the magnetic mark 22 or the like. In the continuous segment 30, the magnetic marks 32 to 34 or the like are arranged on the ground side of a travel route at the pitch equal to the total length of the coil array 4. In the discrete segment 31, the magnetic mark 35 or the like is provided discretely on the ground side of the travel route. The linear scale 2 can implement position detection with a constant precision over the entire continuous segment 30. However, in the discrete segment 31, position detection can be made only in the vicinity of the magnetic mark 35 or the like. Further, the length of the area where detection can be made by one magnetic mark 35 is shorter than the length of the coil array 4.

Figure 3:
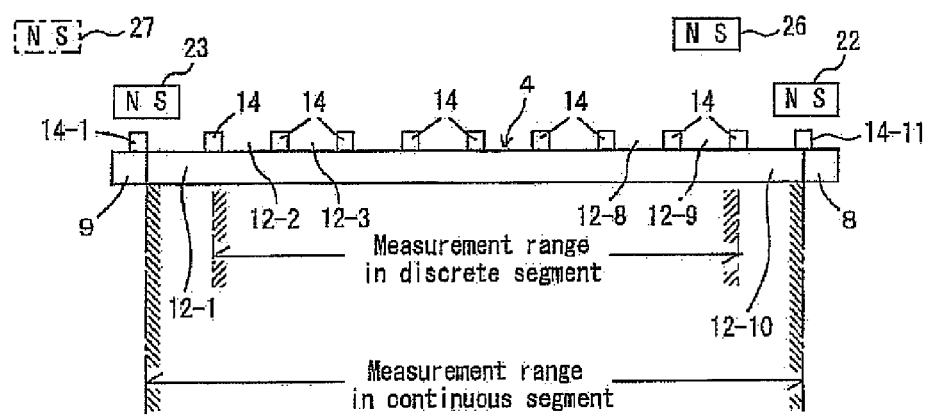
FIG. 3 is a view showing a problem at the time of identifying whether the moving vehicle is in one of the discrete segments or one of the continuous segments, and principles for solving the problem according to a preferred embodiment of the present invention.

FIG. 3 shows measurement ranges in the discrete segment and the continuous segment in the present preferred embodiment. In the continuous segment, the magnetic marks are detected in the entire segment from the pitch 12-1 at the left end to the pitch 12-10 at the right end. In the discrete segment, the magnetic marks are not detected in the pitches 12-1, 12-10 at both ends, and the magnetic marks are detected in a range between the pitches 12-2 and 12-9. A problem may occur at the time of identifying whether the moving vehicle is in the discrete segment or the continuous segment when a magnetic mark is detected in the pitch 12-2 or the pitch 12-9. Specifically, in the case where the magnetic mark 26 is detected, if the magnetic mark 27 is present on the left side in FIG. 3 the magnetic mark 26 is in the continuous segment, and if the magnetic mark 27 is not present, the magnetic mark 26 is in the discrete segment. It is difficult to detect the magnetic mark 27 using the hall element 14-1. In order to solve the problem, in the present preferred embodiment, dummy coils 8, 9 are preferably used to detect the magnetic marks 27 on both sides of the coil array 4. It should be noted that if the magnetic mark is present at the right end of the coil array 4 in the continuous segment, the magnetic mark 23 is present at the left end of the coil array 4, and these magnetic marks 22, 23 can be detected easily by the hall elements 14-11, 14-1.

Figure 4:
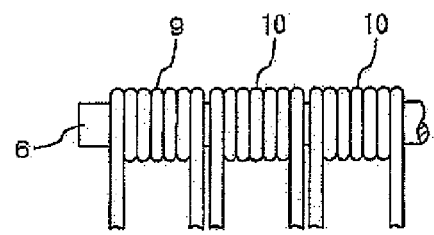
FIG. 4 is a view showing a dummy coil and coils in the vicinity of the dummy coil.

FIG. 4 shows a position of the dummy coil 9. The dummy coil 8 is provided in the same manner as the dummy coil 9. Coils 10 are wound around the magnetic core 6 of silicon steel or the like, and the dummy coil 9 is wound around the same magnetic core 6. The coils 10 and the dummy coil 9 preferably have the same diameter, have the same pitch number, and are made of the same material. Therefore, the dummy coils 8, 9 can be provided by winding two coils that are the same as the coils 10 around the coil array 4 on both sides without any gaps.

Figure 5:
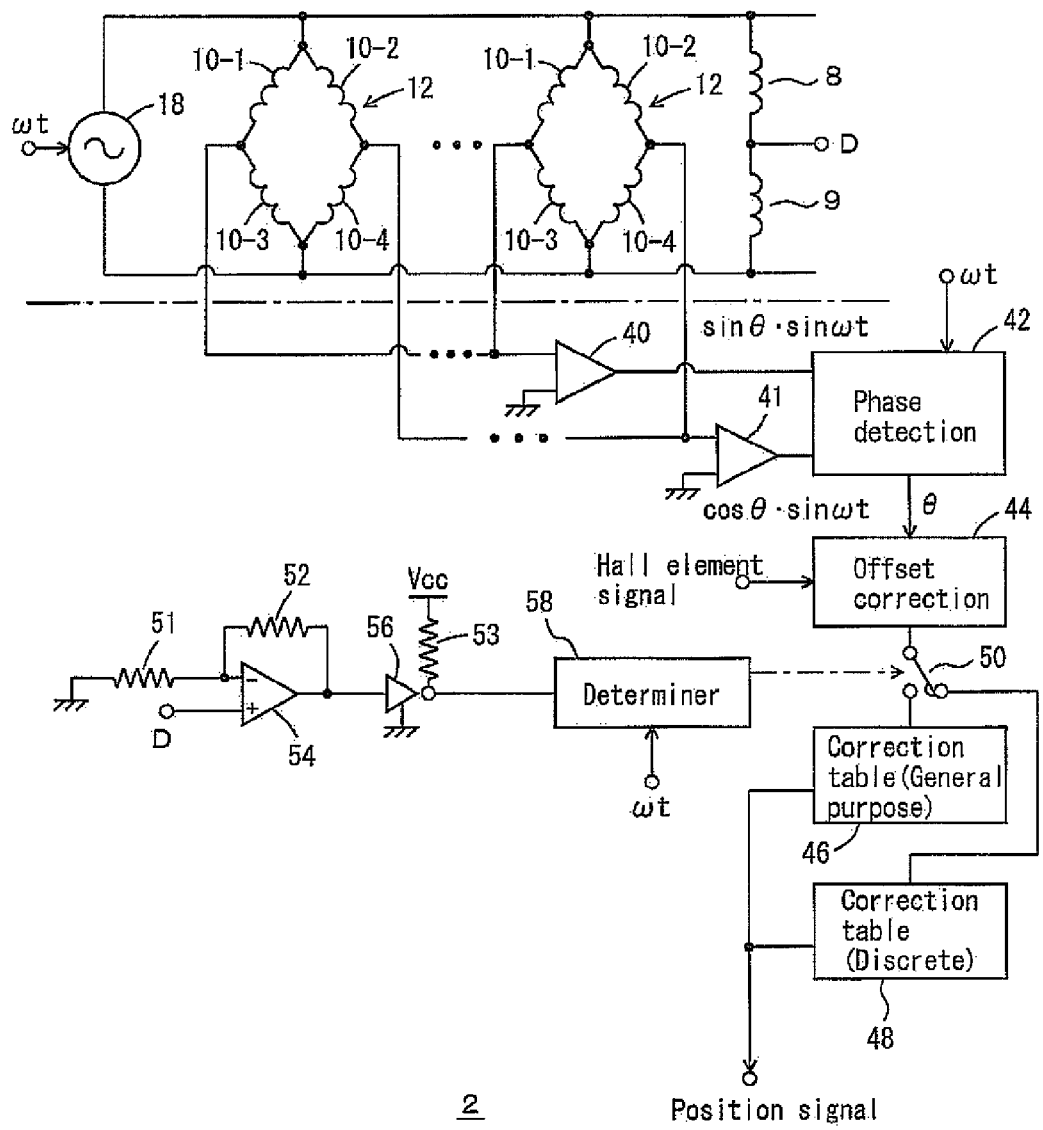
FIG. 5 is a block diagram showing the linear scale according to a preferred embodiment of the present invention.

FIG. 5 is a block diagram showing the linear scale 2. A phase signal $\omega t$ from a counter is supplied to the sinusoidal wave power source 18, and a sinusoidal wave is generated by a digital-to-analog (D/A) converter (not shown). The sinusoidal wave is supplied to each pitch 12 of the coil array and serial pieces of the left and right dummy coils 8, 9. A potential at the middle point between the dummy coils connected in series is denoted by "D". Four coils 10-1 to 10-4 in the respective pitches are arranged in a bridge pattern, and a bridge signal is amplified by amplifier circuits 40, 41. A signal of $\sin\theta \times \sin\omega t$ is collected from the amplifier circuit 40, and a signal of $\cos\theta \times \sin\omega t$ is collected from the amplifier circuit 41. Here, e denotes a position of the magnetic mark relative to the pitch. When the magnetic mark moves a distance of one pitch, $\theta$ has a change of $2\pi$. The amplifier circuits 40, 41 may be provided for each of the pitches. However, in the present preferred embodiment, outputs from the pitches are inputted to the same amplifier circuits 40, 41. A phase detection circuit collects $\theta$ component from the signals from the amplifier circuits 40, 41, and determines at which pitch the magnetic mark is being detected, by the signal of the hall element 14. An offset corrector 44 adds or subtracts an offset corresponding to the number of the pitch.

Since every linear scale 2 is subject to variation, corrections are made by switching two types of correction tables, i.e., a correction table 46 for the continuous segment and a correction table 48 for the discrete segment. In the correction table 46, corrections are made over the range of pitches 12-1 to 12-10 in FIG. 3 in the continuous segment. In the correction table 48, corrections are made over the range of pitches 12-2 to 12-9 in FIG. 3 in the discrete segment. A signal D from the middle point between the dummy coils 8, 9 is amplified by the amplifier circuit 54, amplified by a digital transistor 56 equipped with a resistor or the like, and inputted to determiner 58. Reference numerals 51 to 53 denote fixed resistors. A reference numeral Vcc denotes a circuit power supply. The digital transistor 56 is operated as a comparator using a threshold shown in FIG. 7. The determiner 58 checks the output of the digital transistor 56 at predetermined timing based on the phase signal $\omega t$, identifies whether the moving vehicle is in the discrete segment or the continuous segment, and operates the switch 50. In this manner, whether the position signal after correction of the offset should be corrected by the correction table 46 or the correction table 48 is determined.

Figure 6:
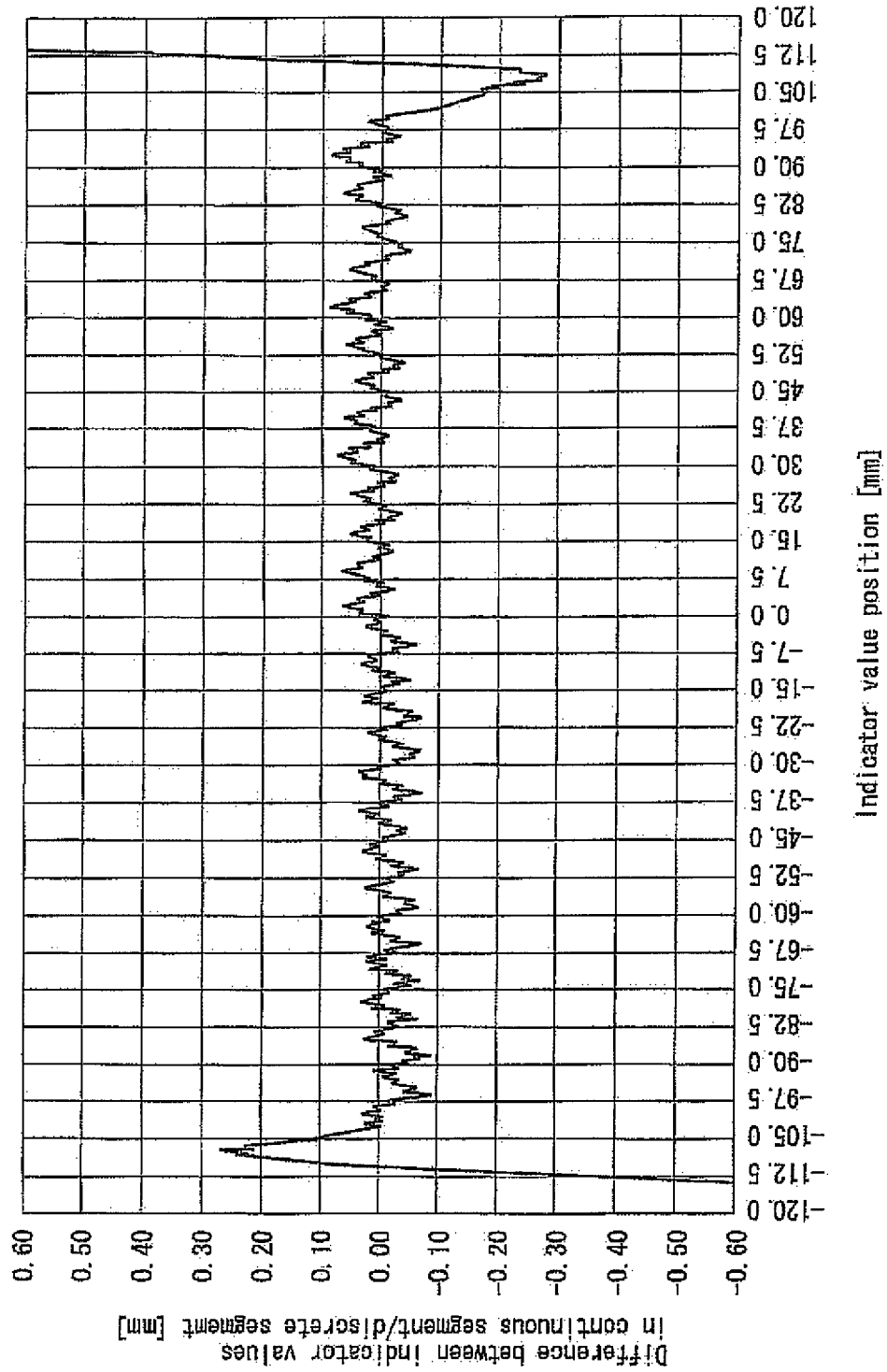
FIG. 6 is a characteristic graph showing a difference between indicator values in the continuous segment and the discrete segment according to a preferred embodiment of the present invention.
Figure 7:
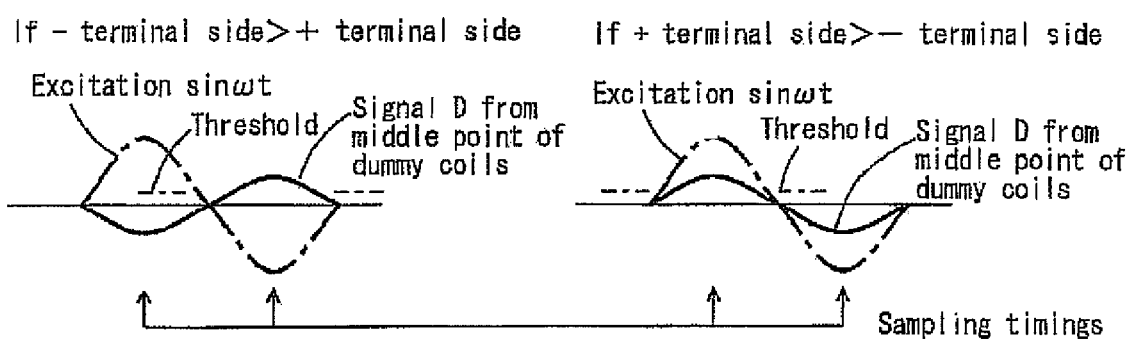
FIG. 7 includes graphs schematically showing phases of an excitation signal and a signal from a middle point of the dummy coils.
Figure 8:
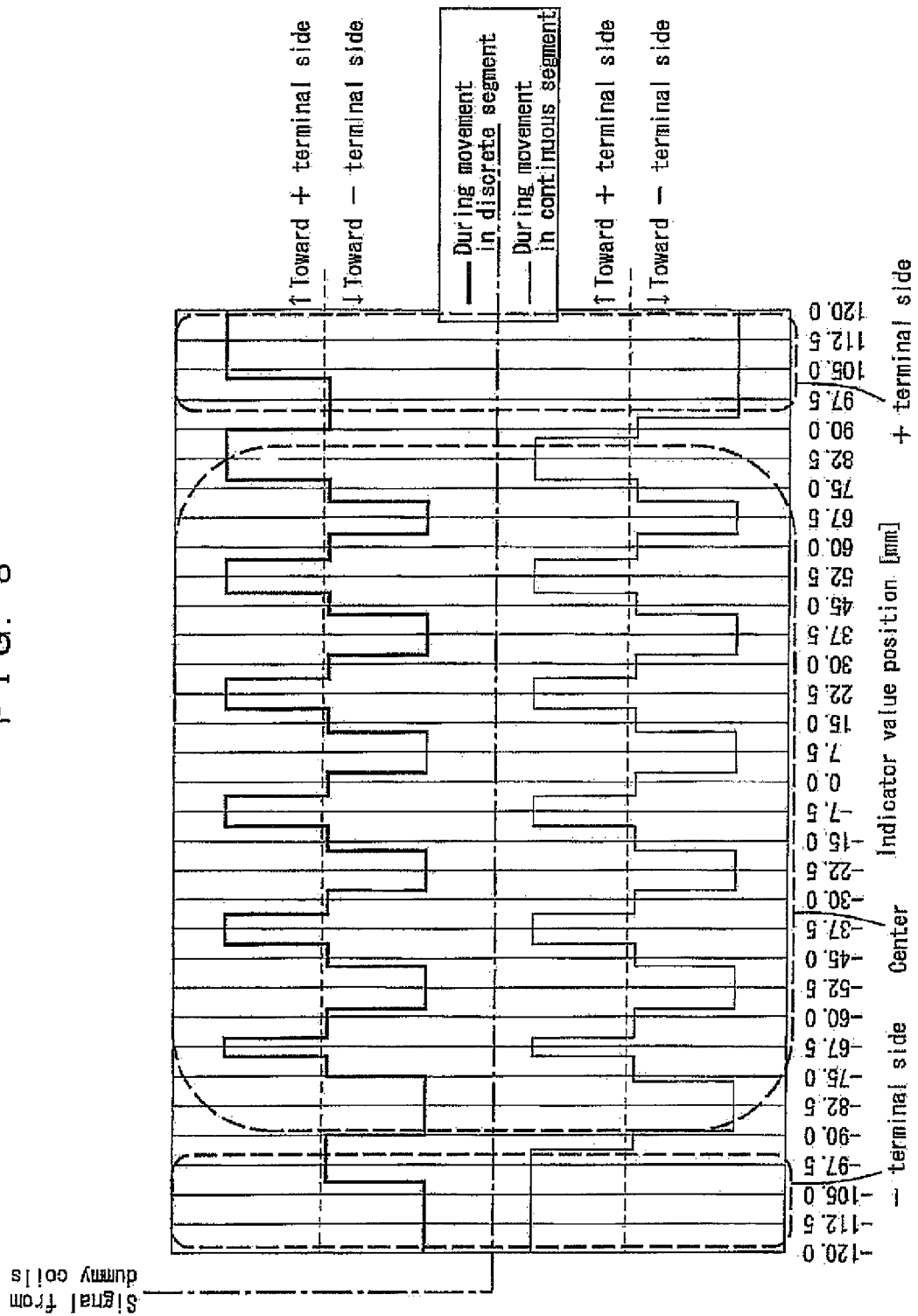
FIG. 8 is a characteristic graph showing results of identification of whether the moving vehicle is in the continuous segment or the discrete segment using the dummy coils in a preferred embodiment of the present invention.

FIGS. 6 to 8 show operation in the present preferred embodiment. FIG. 6 shows a difference between indicator values at positions in the discrete segment and the continuous segment, for the signal before correction by the correction tables 46, 48. In the present preferred embodiment, the total length of the coil array preferably is about 300 mm, and the measurement range preferably is about −150 mm to about +150 mm in the continuous segment, and about −115 mm to about +115 mm in the discrete segment, for example. In the range of about −97.5 mm to about +97.5 mm, the difference in the signal is small regardless of the discrete segment or the continuous segment. Therefore, for this segment, for example, common data is used for the correction table 46 and the correction table 48. In the range of about +97.5 mm to about +115 mm, and in the range of about −97.5 mm to about −115 mm, since the output varies depending on the discrete segment or the continuous segment. Therefore, the correction tables 46, 48 are switched depending on the continuous segment or the discrete segment.

FIG. 7 shows waveforms of the signal D (potential signal) from the middle point between the dummy coils relative to the excitation voltage $\sin\omega t$ applied to the coil array 4. The left side of FIG. 7 shows a state where influence of the magnetic mark is strong on the − terminal side in comparison with the + terminal side. The phase of the signal from the dummy coils is opposite to the phase of the excitation signal. The right side of FIG. 7 shows a state where influence of the magnetic mark is strong on the + terminal side in comparison with the − terminal side. The phase of the signal from the dummy coils is the same as the voltage waveform of the excitation signal. At suitable timing where $\omega t$ is 90°, 270° or the like, the signal D is sampled to check whether the sampled value exceeds an operating threshold of the digital transistor 56. In this manner, whether the moving vehicle is in the continuous segment or the discrete segment can be identified.

FIG. 8 shows results of processing the signal from the dummy coils by the determiner 58. The lateral axis shows a position of the magnetic mark relative to the linear scale. The waveform in bold line shows a waveform in the discrete segment and the waveform in narrow line shows a waveform in the continuous segment. In the case where the magnetic mark is positioned at the center of the linear scale, the signal from the dummy coils does not vary regardless of the continuous segment or the discrete segment. Further, as shown in FIG. 6, in this range, it is not necessary to identify whether the moving vehicle is in the continuous segment or the discrete segment. In the case where the magnetic mark is present on the + terminal side of the linear scale, in the continuous segment, the signal changes in the vicinity of about 95 mm, and then, the signal stays on the − terminal side. Further, in the case where the magnetic mark is present on the + terminal side of the linear scale, in the continuous segment, in the discrete segment, the signal is kept neutral until a position in the vicinity of about 105 mm, and the signal goes to the + terminal side just before 105 mm. Therefore, it is possible to identify whether the moving vehicle is in the continuous segment or the discrete segment from about 95 mm. Also on the − terminal side, it is possible to identify whether the moving vehicle is in the continuous segment or the discrete segment. In the continuous segment, the signal is changed to the + terminal side in the vicinity of about −95 mm. However, in the discrete segment, the signal does not change in the vicinity of about −95 mm, and changed to the − terminal side just before −105 mm.

In the present preferred embodiment, the following advantages are obtained.

(1) When one magnetic mark is present slightly inside both ends of the coil array 4, it is possible to identify whether the moving vehicle is in one of the continuous segments or one of the discrete segments, and improvement in the detection precision is achieved.

(2) By adding a pair of dummy coils 8, 9 on both of left and right sides of the coil array 4, whether the moving vehicle is in one of the continuous segments or one of the discrete segments can be identified without increasing the length of the linear scale 2 significantly.

(3) The dummy coils 8, 9 can be provided on the same magnetic core 6 of the coil array 4. Coils that have the same shape as the coils 10 of the coil array 4 can be used as the dummy coils 8, 9.

(4) The dummy coils 8, 9, and the coil array 4 can be driven by the same sinusoidal wave power supply 18.

(5) Since the pair of dummy coils 8, 9 are provided on the same magnetic core 6, and have the same shape, the balance between impedances of these dummy coils 8, 9 can be kept easily.

(6) The dummy coils 8, 9 adjust the environment of the coils at the outermost pitches 12-1, 12-10 to become close to the environment of the coils at the other pitches.

In the present preferred embodiment, the dummy coils 8, 9 preferably are serially connected to the sinusoidal wave power supply 18, and a potential at the middle point between the dummy coils 8, 9 is extracted. However, each of the dummy coils 8, 9 may be connected individually to the sinusoidal wave power source or the like, and change of the impedance may be measured base on the presence of the magnetic mark.

DESCRIPTION OF THE NUMERALS

2: linear scale
4: coil array
6: magnetic core
8, 9: dummy coil
10: coil
12: pitch
14: hall element
15: detection head
16: processing circuit
18: sinusoidal wave power supply
20: counter
22, 23, 26: magnetic mark
24: yoke
25: permanent magnet
27: magnetic mark
30: continuous segment
31: discrete segment
32 to 35: magnetic mark
40, 41, 54: amplifier circuit
42: phase detector
44: offset corrector
46, 48: correction table
50: switch
51 to 53: resistance
56: digital transistor
58: determiner While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A moving vehicle system comprising:
a moving vehicle; and
a moving route of the moving vehicle; wherein
said moving vehicle includes a detection head arranged to detect a position of the moving vehicle along the moving route, the detection head including a coil array including a plurality of coils arranged along a moving direction of the moving vehicle and dummy coils on both sides of the coil array;
said moving route including magnetic marks, and continuous segments where the magnetic marks are provided at a constant first pitch to determine the position of the moving vehicle continuously, and discrete segments where the magnetic marks are arranged at a pitch wider than the first pitch to determine the position of the moving vehicle only where the detection head detects the magnetic marks; and
said moving vehicle further includes an identification unit arranged to identify whether the moving vehicle is in one of the continuous segments or one of the discrete segments based on a difference between outputs of the dummy coils.

2. The moving vehicle system according to claim 1, wherein the coil array and the dummy coils are arranged to be driven by a common alternating current power supply, and coils of the coil array and the dummy coils are arranged around a common magnetic core in series.

3. The moving vehicle system according to claim 2, wherein the dummy coils and the coils of the coil array have a same shape.

4. The moving vehicle system according to claim 1, wherein the dummy coils on both sides of the coil array are arranged to be serially connected to an alternating current power supply, and whether the moving vehicle is in one of the continuous segments or one of the discrete segments is identified by comparing a phase of a potential at a middle point of the dummy coils on both sides of the coil array with a phase of the alternating current power supply.

5. A method of detecting a position of a moving vehicle along a moving route of the moving vehicle, the method comprising the steps of:

provide the moving vehicle with a detection head including a coil array including a plurality of coils arranged along a moving direction of the moving vehicle and dummy coils on both sides of the coil array;

providing the moving route with magnetic marks;

providing the moving route with continuous segments where the magnetic marks are provided at a constant first pitch and discrete segments where the magnetic marks are arranged at a pitch wider than the first pitch;

identifying by the detection head whether the moving vehicle is in one of the continuous segments or one of the discrete segments according to a difference between outputs of the dummy coils;

determining the position of the moving vehicle continuously by the detection head in one of the continuous segments; and determining the position of the moving vehicle by the detection head only where the detection head detects the magnetic marks in the discrete segments.

* * * * *